United States Patent
Abe et al.

(10) Patent No.: US 11,554,554 B2
(45) Date of Patent: Jan. 17, 2023

(54) METHOD FOR PRODUCING MULTILAYER MEMBER

(71) Applicant: Sika Hamatite Co., LTD., Hiratsuka (JP)

(72) Inventors: Megumi Abe, Hiratsuka (JP); Yuichi Matsuki, Hiratsuka (JP)

(73) Assignee: Sika Hamatite Co., Ltd., Kanagawa (JP)

( * ) Notice: Subject to any disclaimer, the term of this patent is extended or adjusted under 35 U.S.C. 154(b) by 278 days.

(21) Appl. No.: 16/071,871

(22) PCT Filed: Jan. 10, 2017

(86) PCT No.: PCT/JP2017/000454
§ 371 (c)(1),
(2) Date: Jul. 20, 2018

(87) PCT Pub. No.: WO2017/126362
PCT Pub. Date: Jul. 27, 2017

(65) Prior Publication Data
US 2019/0030830 A1 Jan. 31, 2019

(30) Foreign Application Priority Data
Jan. 21, 2016 (JP) ............................. JP2016-009613

(51) Int. Cl.
*B29C 65/52* (2006.01)
*B32B 27/32* (2006.01)
(Continued)

(52) U.S. Cl.
CPC ............ *B29C 65/522* (2013.01); *B29C 48/08* (2019.02); *B29C 59/08* (2013.01); *B29C 59/14* (2013.01);
(Continued)

(58) Field of Classification Search
None
See application file for complete search history.

(56) References Cited

U.S. PATENT DOCUMENTS

2008/0264560 A1* 10/2008 Oosaki .................. B29C 66/54
156/304.2
2013/0344268 A1 12/2013 Choi
(Continued)

FOREIGN PATENT DOCUMENTS

EP  1 270 198   1/2003
GB  2527763     1/2016
(Continued)

OTHER PUBLICATIONS

Koshal. Manufacturing Engineer's Reference Book. Elsevier 1993 (Year: 1993).*
(Continued)

*Primary Examiner* — Jacob T Minskey
*Assistant Examiner* — Adrianna N Konves
(74) *Attorney, Agent, or Firm* — Thorpe North & Western

(57) ABSTRACT

A method for producing a multilayer member having a first member containing a crystallizable thermoplastic resin, an adhesion layer, and a second member includes performing a dry treatment on a surface of the first member containing a crystallizable thermoplastic resin so as to satisfy conditions A and B, applying an adhesive to the surface of the first member to form an adhesive layer on the surface, and adhering the second member to the adhesive layer. (A) The ultimate temperature of the first member is lower than the peak temperature of endothermic peak obtained by DSC of the crystallizable thermoplastic resin. (B) The high temperature holding time of the first member is less than 3.0 seconds, which is when the first member is continuously held at a temperature not lower than a temperature at the starting point of the endothermic peak obtained by DSC of the crystallizable thermoplastic resin.

20 Claims, 2 Drawing Sheets

(51) Int. Cl.

| | | |
|---|---|---|
| *B32B 37/06* | (2006.01) | |
| *B29C 59/16* | (2006.01) | |
| *B32B 38/00* | (2006.01) | |
| *B32B 37/12* | (2006.01) | |
| *C09J 5/00* | (2006.01) | |
| *C09J 201/00* | (2006.01) | |
| *B29C 59/14* | (2006.01) | |
| *B29C 59/08* | (2006.01) | |
| *B29C 48/08* | (2019.01) | |
| *C09J 5/06* | (2006.01) | |
| *B29C 35/08* | (2006.01) | |
| *B32B 7/12* | (2006.01) | |
| *B32B 27/36* | (2006.01) | |

(52) U.S. Cl.
CPC .............. *B29C 59/16* (2013.01); *B29C 65/52* (2013.01); *B32B 27/32* (2013.01); *B32B 37/06* (2013.01); *B32B 37/12* (2013.01); *B32B 38/0008* (2013.01); *C09J 5/00* (2013.01); *C09J 5/06* (2013.01); *C09J 201/00* (2013.01); *B29C 2035/0827* (2013.01); *B32B 7/12* (2013.01); *B32B 27/36* (2013.01); *B32B 2038/0048* (2013.01)

(56) References Cited

U.S. PATENT DOCUMENTS

| | | |
|---|---|---|
| 2014/0190613 A1 | 7/2014 | Choi |
| 2016/0145419 A1* | 5/2016 | Takano .................. C08K 5/098 524/607 |
| 2017/0130106 A1 | 5/2017 | Matsuki et al. |

FOREIGN PATENT DOCUMENTS

| | | | |
|---|---|---|---|
| JP | 2001-062892 | | 3/2001 |
| JP | 2013-220688 | | 10/2013 |
| JP | 2013220688 A | * | 10/2013 |
| JP | 2014-025000 | | 2/2014 |
| JP | 5794356 | | 10/2015 |
| WO | WO 2014-000700 | | 1/2014 |
| WO | WO 2016-001808 | | 1/2016 |
| WO | WO 2016-002518 | | 1/2016 |

OTHER PUBLICATIONS

Packham. Handbook of Adhesion. John Wiley & Sons 2006. (Year: 2006).*
Engineering Design Handbook—Environmental Series, Part Two—Natural Environmental Factors (AMCP 706-116). U.S. Army Materiel Command 1975. (Year: 1975).*
Machine English Translation of JP2013220688, Accessed Jun. 22, 2021 (Year: 2013).*
Farris et al. (The fundamentals of flame treatment for the surface activation of polyolefin polymers—A review, Polymer, vol. 51, Issue 16, 2010, pp. 3591-3605) (Year: 2010).*
European Search Report for European Application No. 17741242.6 dated Aug. 20, 2019, 5 pages, Germany.
International Search Report for International Application No. PCT/JP2017/000454 dated Feb. 28, 2017, 2 pages, Japan.
Chinese Office Action for Chinese Application No. 201780006178.9 dated Jan. 29, 2021, 15 pages, China.
Anonymous: "Polypropylene—Wikipedia, the free encyclopedia", Dec. 30, 2015, Retrieved from the Internet: URL: http://web.archive.org/web/201512302357 44/https://en.wikipedia.org/wiki/Polypropylene, retrieved on Feb. 10, 2022, 11 pages, United States.

* cited by examiner

FIG. 1A
FIG. 1B
FIG. 1C
FIG. 1D
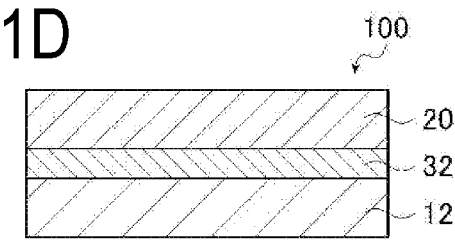
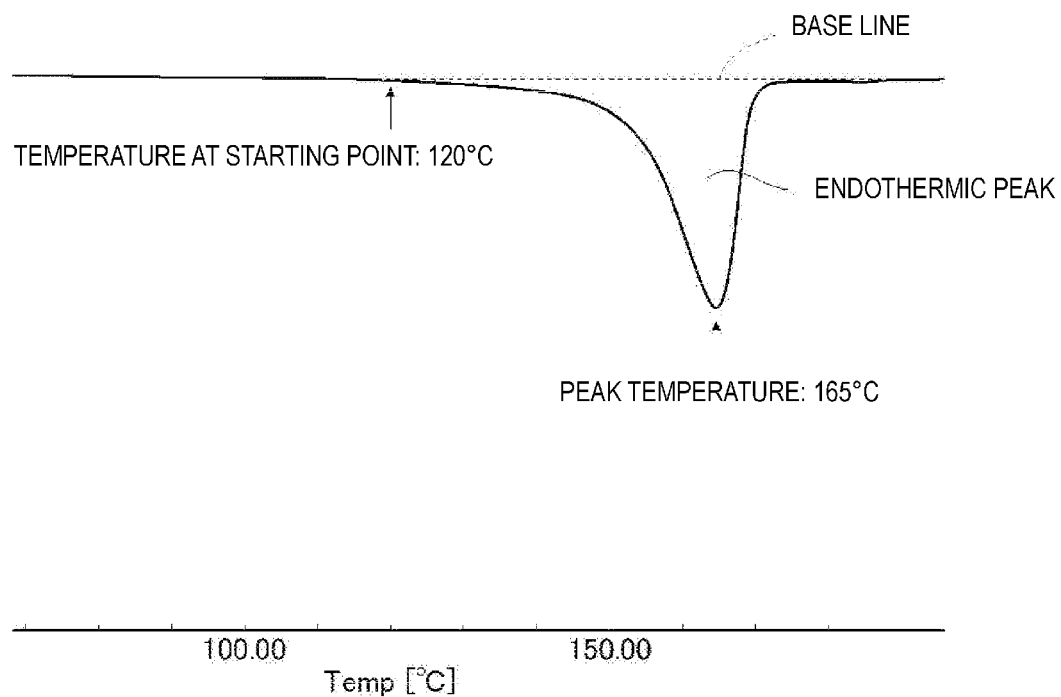
FIG. 2

METHOD FOR PRODUCING MULTILAYER MEMBER

TECHNICAL FIELD

The present technology relates to a method for producing a multilayer member.

BACKGROUND ART

A steel plate has been used for interior and exterior parts of an automobile, such as a body, a front door, a rear door, a back door, a front bumper, a rear bumper, and a rocker molding of an automobile in the related art. From the viewpoint of light weight of an automobile, partial use of a crystallizable thermoplastic resin such as a polypropylene resin is increased.

In a case of using a resin for interior and exterior parts of an automobile as described above, a primer composition is usually applied to an adhesion face of a resin member and an adhesive is then applied followed by adhering.

To eliminate a step of applying a primer composition, a method in which an adhesion face of a resin member is subjected to a dry treatment such as a flame treatment, a corona treatment, a plasma treatment, and ITRO treatment, in advance and a predetermined adhesive is applied directly to the adhesion face followed by adhering, to produce an adhesion member (multilayer member) has been also proposed (for example, Japan Unexamined Patent Publication No. 2014-25000).

Recently, the level of requirement for an automobile, such as safety and fuel consumption, has increased. Further improvement is required for the adhesion of a multilayer member (adhesion between adhered members).

When the present inventors produced a multilayer member by using a dry treatment and an adhesive without a primer with reference to Japan Unexamined Patent Publication No. 2014-25000, they found that the adhesion of the multilayer member is not necessarily sufficient.

SUMMARY

The present technology provides a method for producing a multilayer member exhibiting excellent adhesion without a primer.

The present inventors have found that a member containing a crystallizable thermoplastic resin can be subjected to a dry treatment so as to satisfy a specific condition. Specifically, the present technology provides the following features.

(1) A method for producing a multilayer member having a first member containing a crystallizable thermoplastic resin, an adhesion layer, and a second member in this order, the method including:

a surface treatment step of performing a dry treatment on a surface of the first member containing a crystallizable thermoplastic resin to satisfy conditions A and B;

an adhesive application step of applying an adhesive to the surface of the first member subjected to the dry treatment without a primer composition, to form an adhesive layer on the surface; and an adhering step of adhering the second member to the adhesive layer.

(Condition A) The ultimate temperature of the first member is lower than the peak temperature of endothermic peak obtained by differential scanning calorimetry of the crystallizable thermoplastic resin contained in the first member.

(Condition B) The high temperature holding time of the first member is less than 3.0 seconds. Herein, the high temperature holding time of the first member is a time when the first member is continuously held at a temperature not lower than a temperature at the starting point of the endothermic peak obtained by differential scanning calorimetry of the crystallizable thermoplastic resin contained in the first member.

(2) The method for producing a multilayer member according to (1), wherein the second member is a coated member.

(3) The method for producing a multilayer member according to (1) or (2), wherein the dry treatment is at least one selected from the group consisting of a corona treatment, a plasma treatment, a flame treatment, ITRO treatment, an UV (ultraviolet) treatment, and an excimer treatment.

(4) The method for producing a multilayer member according to any of (1) to (3), wherein the first member is a composite material containing a polyolefin resin as the thermoplastic resin and an inorganic substance.

(5) The method for producing a multilayer member according to any of (1) to (4), wherein the adhesive is at least one selected from the group consisting of an urethane-based adhesive, an epoxy-based adhesive, a modified silicone-based adhesive, and an acrylic adhesive.

(6) The method for producing a multilayer member according to any of (1) to (5), wherein in the dry treatment, the temperature of the first member is measured by using a contact thermocouple, an ink to be discolored by heat, a seal to be discolored by heat, a thermography, or a radiation thermometer.

(7) The method for producing a multilayer member according to any of (1) to (6), further including a surface treatment step of performing a dry treatment on a surface of the second member before the adhering step to satisfy conditions A2 and B2, wherein the second member contains a crystallizable thermoplastic resin, and in the adhering step, the surface of the second member in which the surface treatment is performed is adhered to the adhesive layer.

(Condition A2) The ultimate temperature of the second member is lower than the peak temperature of endothermic peak obtained by differential scanning calorimetry of the crystallizable thermoplastic resin contained in the second member.

(Condition B2) The high temperature holding time of the second member is less than 3.0 seconds. Herein, the high temperature holding time of the second member is a time when the second member is continuously held at a temperature not lower than a temperature at the starting point of the endothermic peak obtained by differential scanning calorimetry of the crystallizable thermoplastic resin contained in the second member.

As described below, the present technology can provide a method for producing a multilayer member exhibiting excellent adhesion without a primer.

BRIEF DESCRIPTION OF DRAWINGS

FIGS. 1A-1D include cross-sectional views schematically illustrating an embodiment of a method of the present technology in the order of steps.

FIG. 2 is a DSC (Differential Scanning calorimetry) curve of a polypropylene composite material used in Examples.

DETAILED DESCRIPTION

Figure 3:
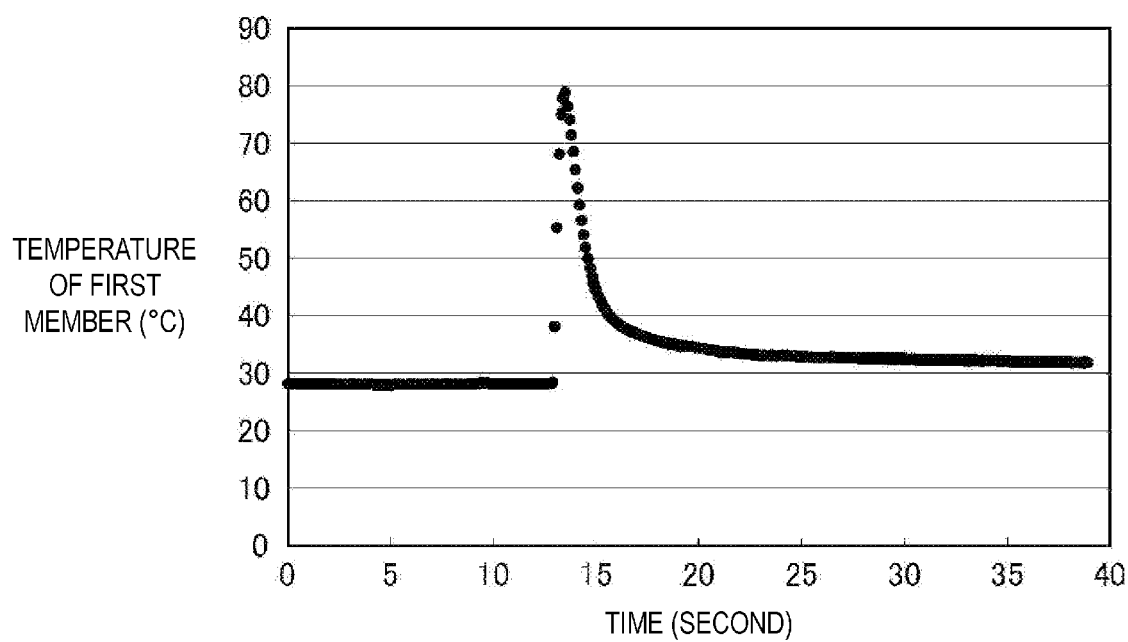
FIG. 3 is a diagram obtained by plotting a temperature of the first member with time in a surface treatment step of Example 1.

A method for producing a multilayer member of the present technology will be described hereinafter.

Note that in the present specification, numerical ranges indicated using "(from) . . . to . . . " include the former number as the lower limit value and the later number as the upper limit value.

The method for producing a multilayer member of the present technology (hereinafter sometimes simply referred to as "the method of the present technology") is a method for producing a multilayer member having a first member containing a crystallizable thermoplastic resin, an adhesion layer, and a second member in this order, and includes three steps described below.

(1) Step 1: Surface Treatment Step
A step of performing a dry treatment on a surface of the first member containing a crystallizable thermoplastic resin so as to satisfy the following conditions A and B
(2) Step 2: Adhesive Application Step
A step of applying an adhesive to the surface of the first member subjected to the dry treatment without a primer composition, to form an adhesive layer on the surface subjected to the dry treatment
(3) Step 3: Adhering Step
A step of adhering the second member to the adhesive layer According to this configuration of the method of the present technology, a layered body to be obtained is assumed to exhibit excellent adhesive properties. Although the reason is not clear, it is assumed to be as follows.

Since in the present technology, the surface of the member containing a crystallizable thermoplastic resin is subjected to the dry treatment so as to satisfy the following conditions A and B (hereinafter, the conditions A and B are collectively referred to as "specific conditions"), it is considered that the surface of the member is made hydrophilic without impairing the crystallizability of outermost surface of the member. Therefore, the adhesive is stabilized on the surface of the member made hydrophilic to form an adhesive layer sufficiently in contact with the entire surface, and a crystal structure of the outermost surface of the member acts as an anchor to strongly fix an adhesion layer formed from the adhesive layer onto the member. As a result, it is considered that a multilayer member exhibiting excellent adhesion is obtained without a primer composition.

The method of the present technology will be described with reference to the drawings.

FIGS. 1A-1D include cross-sectional views schematically illustrating an embodiment of the method of the present technology in the order of steps.

FIG. 1A illustrates a first member 10 used in the surface treatment step.

In the surface treatment step, a surface 10a of the first member 10 is subjected to a dry treatment so as to satisfy the specific conditions. Thus, a first member 12 after the dry treatment is obtained (FIG. 1B).

In the adhesive application step, the adhesive is applied to a surface 12a of the dried first member 12 without a primer composition, to form an adhesive layer 30 on the surface 12a (FIG. 1C).

In the adhering step, a second member 20 is adhered to the adhesive layer 30. As a result, a multilayer member 100 having the first member 12, an adhesion layer 32 (a layer obtained by curing the adhesive layer 30), and the second member 20 is obtained (FIG. 1D).

Hereinafter, each step will be described in detail.
Step 1: Surface Treatment Step The surface treatment step is a step of performing a dry treatment on the surface of the first member containing a crystallizable thermoplastic resin so as to satisfy the following conditions A and B.
First Member The first member used in the surface treatment step is not particularly limited as long as it is a member (preferably substrate) containing a crystallizable thermoplastic resin. When the multilayer member produced by the method of the present technology is used as an exterior part of an automobile, such as a back door of an automobile, it is preferable that the first member be used as a member located on the inside (inner member).

The crystallizable thermoplastic resin is not particularly limited as long as it is a thermoplastic resin having crystallizability. Specific examples thereof include a polyolefin resin such as polyethylene, polypropylene, and polybutylene; a methacrylate-based resin such as polymethyl methacrylate; a polystyrene-based resin such as polystyrene, ABS (acrylonitrile butadiene styrene), and AS (acrylonitrile styrene); a polyester-based resin such as polyethylene terephthalate (PET), polybutylene terephthalate (PBT), polytrimethylene terephthalate, polyethylene naphthalate (PEN), and poly(1,4-cyclohexyldimethylene terephthalate) (PCT); a polyamide resin selected from a nylon resin and a nylon copolymer resin such as polycaproamide (nylon 6), polyhexamethylene adipamide (nylon 66), polyhexamethylene sebacamide (nylon 610), polyhexamethylene dodecamide (nylon 612), polydedecane amide (nylon 12), polyhexamethylene terephthalamide (nylon 6T), polyhexamethylene isophthalamide (nylon 6I), polycaproamide/polyhexamethylene terephthalamide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/6I); a polyvinyl chloride resin; polyoxymethylene (POM); a polycarbonate (PC) resin; a polyphenylene sulfide (PPS) resin; a modified polyphenylene ether (PPE) resin; a polyetherimide (PEI) resin; a polysulfone (PSF) resin; a polyether sulfone (PES) resin; a polyketone resin; a polyether nitrile (PEN) resin; a polyether ketone (PEK) resin; a polyetherether ketone (PEEK) resin; a polyether ketone ketone (PEKK) resin; a polyimide (PI) resin; a polyamideimide (PAI) resin; a fluororesin; and modified resins obtained by modifying the resins, or a mixture of the resins. Among these, a polyolefin resin is preferable, polyethylene and polypropylene are more preferable, and polypropylene is further preferable. The first member may contain two or more kinds of crystallizable thermoplastic resin.

The content of the crystallizable thermoplastic resin in the first member is preferably from 10 to 100 mass %, and more preferably from 60 to 100 mass %.

The first member is preferably a composite member containing the crystallizable thermoplastic resin and an inorganic substance. Examples of the inorganic substance include silica, titanium oxide, magnesium oxide, antimony oxide, aluminum hydroxide, magnesium hydroxide, calcium hydroxide, calcium carbonate, talc, clay, mica, glass fibers, carbon black, graphite, and carbon fibers. The first member may contain two or more kinds of inorganic substance.

The melting point (peak temperature described below) of the first member is preferably from 100 to 300° C., and more preferably from 150 to 200° C.

When the first member is a substrate (a flat plate), the thickness thereof is not particularly limited, and is preferably from 1 μm to 100 mm.

Dry Treatment

The dry treatment is not particularly limited as long as it satisfies conditions A and B (specific conditions) described below. The dry treatment may be performed on the entire or a part of surface of the first member. When the first member is a substrate, it is preferable that the dry treatment be performed on one surface of the substrate.

The kind of the dry treatment is not particularly limited. The dry treatment is preferably at least one selected from the group consisting of a corona treatment, a plasma treatment, a flame treatment, ITRO treatment, an UV treatment (ultraviolet irradiation treatment), and an excimer treatment, and more preferably a flame treatment, a plasma treatment, a corona treatment, or ITRO treatment, and further preferably a flame treatment or a plasma treatment.

The dry treatment may include a single dry treatment (once) (e.g., single sweeping treatment) or a plurality of single dry treatments (a plurality of times) (e.g., a plurality of sweeping treatments). When the dry treatment includes a plurality of single dry treatments, the single dry treatments may be performed without interval (continuous treatment), or the member may be subjected to the single dry treatment, cooling, and the next unit dry treatment (intermittent treatment).

Flame Treatment

The flame treatment is a surface treatment method using a flame.

In the flame treatment, a known method such as a method using a burner can be used.

The gas pressure in the flame treatment is preferably from 0.005 to 10 MPa, and more preferably from 0.01 to 1.5 MPa.

The speed in the flame treatment is preferably from 100 to 2000 mm/s, and more preferably from 200 to 1000 mm/s.

When the flame treatment is performed by using a burner, the distance between the burner and the surface of the first member is preferably from 10 to 600 mm, and more preferably from 20 to 400 mm.

Plasma Treatment

The plasma treatment is a surface treatment method using plasma discharge.

The plasma treatment is not particularly limited. Examples thereof include an atmospheric pressure plasma treatment and a vacuum plasma treatment.

A plasma gas (processing gas) used in the plasma treatment is not particularly limited. Examples thereof include a nitrogen gas, a helium gas, and an argon gas, and a mixed gas including the aforementioned gas with one or more of an oxygen gas, a carbon dioxide gas, and a hydrogen gas.

The speed in the plasma treatment is preferably from 10 to 1500 mm/s, and more preferably from 50 to 1000 mm/s.

When the plasma treatment is performed by using a plasma discharge nozzle, the distance between the plasma discharge nozzle and the surface of the first member is preferably from 1 to 100 mm, and more preferably from 5 to 50 mm.

Corona Treatment

The corona treatment is a surface treatment method using corona discharge.

The speed in the corona treatment is preferably from 10 to 1000 mm/s, and more preferably from 20 to 500 mm/s.

When the corona treatment is performed by using a corona discharge nozzle, the distance between the corona discharge nozzle and the surface of the member is preferably from 1 to 100 mm, and more preferably from 5 to 50 mm.

ITRO Treatment

In ITRO treatment, a silane compound or the like is introduced into a fuel gas to form a flame, and the flame is used to treat the surface, forming a nano-level silicon oxide film on the surface. Thus, the adhesive properties between the surface and the adhesive is improved.

The gas pressure in the ITRO treatment is preferably from 0.005 to 10 MPa, and more preferably from 0.01 to 1.5 MPa.

The speed in the ITRO treatment is preferably from 100 to 2000 mm/s, and more preferably from 200 to 1000 mm/s.

When the ITRO treatment is performed by using a burner, the distance between the burner and the surface of the member is preferably from 1 to 600 mm, and more preferably from 20 to 400 mm.

Conditions A and B

The dry treatment is performed so as to satisfy the following conditions A and B.

(Condition A) The ultimate temperature of the first member described above is lower than the peak temperature of endothermic peak obtained by differential scanning calorimetry of the crystallizable thermoplastic resin contained in the first member.

(Condition B) The high temperature holding time of the first member is less than 3.0 seconds. Herein, the high temperature holding time of the first member is a time when the first member is continuously held at a temperature not lower than a temperature at the starting point of the endothermic peak obtained by differential scanning calorimetry of the crystallizable thermoplastic resin contained in the first member.

The ultimate temperature of the first member is preferably not lower than the temperature at the starting point.

The high temperature holding time of the first member is preferably not greater than 2.0 seconds, more preferably not greater than 1.0 second, and further preferably 0 seconds.

The temperature of the first member in the dry treatment can be measured, for example, by using a contact thermocouple such as an adhesive thermocouple, an ink to be discolored by heat, a seal to be discolored by heat, a thermography, or a radiation thermometer.

The peak temperature of endothermic peak obtained by differential scanning calorimetry of the crystallizable thermoplastic resin means the temperature (melting peak temperature) of apex of the endothermic peak (melting peak).

The temperature at the starting point of the endothermic peak obtained by differential scanning calorimetry of the crystallizable thermoplastic resin means the lowest temperature at which the distance in a direction perpendicular to a vertical axis between a base line and a DSC curve is not less than 1% of the distance in the direction perpendicular to the vertical axis between the base line and the peak temperature.

DSC of the crystallizable thermoplastic resin is performed in accordance with JIS (Japanese Industrial Standard) K7121.

When the conditions of the dry treatment (e.g., the aforementioned speed, distance, and the like) are controlled, the dry treatment that satisfies the conditions A and B can be performed.

Step 2: Adhesive Application Step

The adhesive application step is a step of applying an adhesive to the surface of the first member subjected to the dry treatment without a primer composition, to form an adhesive layer on the surface of the first member.

Adhesive

The adhesive is not particularly limited. Specific examples thereof include an acrylic adhesive, a rubber-based adhesive, a silicone-based adhesive, an urethane-based adhesive, an α-olefinic adhesive, an ether-based adhesive, an ethylene-vinyl acetate resin-based adhesive, an epoxy resin-based adhesive, a vinyl chloride resin-based adhesive, a chloroprene rubber-based adhesive, a cyanoacrylate-based adhesive, an aqueous polymer-isocyanate-based adhesive, a styrene-butadiene rubber-based adhesive, a nitrile rubber-based adhesive, a nitrocellulose-based adhesive, a reactive hot melt adhesive, a phenolic resin-based adhesive, a modified silicone-based adhesive, a polyamide resin-based adhesive, a polyimide-based adhesive, a polyurethane resin-based adhesive, a polyolefin resin-based adhesive, a polyvinyl acetate-based adhesive, a polystyrene resin solvent-based adhesive, a polyvinyl alcohol-based adhesive, a polyvinylpyrrolidone resin-based adhesive, a polyvinyl butyral resin-based adhesive, a polybenzimidazole-based adhesive, a polymethacrylate resin-based adhesive, a melamine resin-based adhesive, an urea resin-based adhesive, and a resorcinol-based adhesive. The adhesive is preferably at least one selected from the group consisting of a urethane-based adhesive, an epoxy-based adhesive, a modified silicone-based adhesive, and an acrylic adhesive, and more preferably a urethane-based adhesive.

It is preferable that the urethane-based adhesive and the epoxy-based adhesive be a one-part or two-part adhesive.

Examples of a one-part urethane-based adhesive include a moisture-curing adhesive containing a urethane prepolymer having an isocyanate group.

Examples of a two-part urethane-based adhesive include an adhesive containing a main agent containing a polyol and a curing agent containing isocyanate.

Examples of a one-part epoxy-based adhesive include a normal temperature-curing or heating-curing adhesive containing a latent curing agent such as ketimine, oxazolidine, and aldimine compounds and a liquid epoxy resin.

Examples of a two-part epoxy resin-based adhesive include an adhesive containing a main agent selected from a liquid epoxy resin (e.g., a bisphenol A type epoxy resin, a bisphenol F type epoxy resin, a bisphenol AD type epoxy resin, or a novolac epoxy resin) and a curing agent (e.g., an amine-based curing agent such as a linear aliphatic amine, a cyclic aliphatic amine, and an aromatic amine, a nitrogen-containing aromatic amine such as an imidazole compound, and an amidoamine curing agent).

Application Method

A method for applying an adhesive to the surface of the first member subjected to the dry treatment is not particularly limited. Examples thereof include a dip coating method, a coating method with a double roll coater, a slit coater, an air knife coater, a wire bar coater, a slide hopper, spray coating, a blade coater, a doctor coater, a squeeze coater, a reverse roll coater, a transfer roll coater, an extrusion coater, a curtain coater, a dip coater, a die coater, or a gravure roll, a screen printing method, a dip coating method, a spray coating method, a spin coating method, and an inkjet method.

The thickness of the adhesive layer formed is not particularly limited and is preferably from 0.1 to 20 mm.

Step 3: Adhering Step

The adhering step is a step of adhering the second member to the adhesive layer described above.

Thus, a multilayer member having the first member, the adhesion layer (obtained by curing the adhesive layer), and the second member in this order is obtained.

Second Member

A material for the second member is not particularly limited and examples thereof include a resin, a glass, and a metal. Examples of the resin include the crystallizable thermoplastic resin described above.

When the multilayer member produced by the method of the present technology is used as an exterior part of an automobile, such as a back door of an automobile, it is preferable that the second member be used as a member located on the outside (outer member).

From the viewpoint of further improving the adhesion between the second member and the adhesion layer, the surface of the second member may be subjected to coating or the aforementioned dry treatment before adhering the second member.

Adhering Method

A method for adhering the second member to the adhesive layer is not particularly limited and examples thereof include a pressure-bonding method. To cure the adhesive, a heating treatment or the like may be performed after adhering the second member.

When the second member contains the crystallizable thermoplastic resin, it is preferable that a surface treatment step of performing a dry treatment on the surface of the second member so as to satisfy the following conditions A2 and B2 be performed before the adhering step. In the adhering step, a surface of the second member subjected to a surface treatment is adhered to the adhesion layer.

(Condition A2) The ultimate temperature of the second member is lower than the peak temperature of endothermic peak obtained by differential scanning calorimetry of the crystallizable thermoplastic resin contained in the second member.

(Condition B2) The high temperature holding time of the second member is less than 3.0 seconds. Herein, the high temperature holding time of the second member is a time when the second member is continuously held at a temperature not lower than a temperature at the starting point of the endothermic peak obtained by differential scanning calorimetry of the crystallizable thermoplastic resin contained in the second member.

A specific and suitable aspect of the surface treatment step is the same as that in Step 1.

The definitions of peak temperature and temperature at the starting point are the same as those in Step 1.

Use

Since the adhesion of the multilayer member produced by the method of the present technology is excellent, the multilayer member is especially useful in interior and exterior parts of an automobile, such as a body, a front door, a rear door, a back door, a front bumper, a rear bumper, and a rocker molding of an automobile.

EXAMPLES

Hereinafter, the present technology will be described in further detail, but the present technology is not limited to these Examples.

Preparation of Adhesive

Components shown in Table 1 below were mixed at a composition (part by mass) shown in Table 1 by a stirrer, to prepare a main agent shown in an upper part of Table 1 and a curing agent shown in a lower part of Table 1.

Subsequently, 100 g of the prepared main agent and 10 g of the curing agent were mixed to obtain adhesives 1 to 3.

TABLE 1

| | | Adhesive 1 | Adhesive 2 | Adhesive 3 |
|---|---|---|---|---|
| Main agent | Polymer 1 | 42.4 | 44.4 | |
| | Polymer 2 | | | 29.9 |
| | Epoxy resin 1 | | | 2.8 |
| | Epoxy resin 2 | | | 11.4 |
| | Compound 1 | 1.7 | | |
| | Compound 2 | 0.3 | | |
| | Carbon black | 20.6 | 20.6 | 3.3 |
| | Calcium carbonate 1 | 19.3 | 19.3 | 7.9 |
| | Calcium carbonate 2 | | | 41.5 |
| | Plasticizer 1 | 15.5 | 15.5 | |
| | Plasticizer 2 | | | 3.1 |
| | Catalyst 1 | 0.2 | 0.2 | |
| | Total | 100.0 | 100.0 | 100.0 |
| Curing agent | Compound 3 | 45.9 | 45.9 | 9.8 |
| | Compound 4 | 5.0 | 5.0 | |
| | Compound 5 | 2 | | |
| | Compound 6 | | | 5.2 |
| | Compound 7 | | | 2.5 |
| | Compound 8 | | | 31.3 |
| | Calcium carbonate 2 | 46.8 | 48.8 | 46.0 |
| | Catalyst 1 | 0.3 | 0.3 | |
| | Catalyst 2 | | | 5.2 |
| | Total | 100.0 | 100.0 | 100.0 |
| Main agent/curing agent (mass ratio) | | 10/1 | 10/1 | 10/1 |

Details of the components in Table 1 are as follows.

Polymer 1: Urethane Prepolymer Synthesized as Described Below 700 g of polyoxypropylene diol (average molecular weight: 2000), 300 g of polyoxypropylene triol (average molecular weight: 3000), and 499 g of 4,4'-diisocyanate phenylmethane (molecular weight: 250) were mixed (at this time, NCO/OH=2.0), 500 g of diisononyl phthalate was further added, and the mixture was stirred at 80° C. for 12 hours in a nitrogen gas stream, resulting in a reaction. A urethane prepolymer (polymer 1) containing 2.10% of isocyanate group was synthesized.

Polymer 2: Kaneka MS polymer S203 (available from Kaneka Corporation)

Epoxy resin 1: ADEKA RESIN EP-4100 (available from ADEKA Corporation)

Epoxy resin 2: ADEKA RESIN EP-4006 (available from ADEKA Corporation)

Compound 1: isocyanurate body of hexamethylene diisocyanate (Tolonate HDT available from Perstorp)

Compound 2: Dimerone (terpene resin, available from Yasuhara Chemical Co., Ltd.)

Compound 3: trifunctional polypropylene polyol (EXCENOL 1030 available from Asahi Glass Co., Ltd.)

Compound 4: polybutadienediol (Poly bd R-45HT available from Idemitsu Kosan Co., Ltd., hydroxyl value: 0.8 mol/kg)

Compound 5: terpineol (available from YASUHARA CHEMICAL CO., LTD.)

Compound 6: 3-glycidoxypropyltrimethoxysilane Sila-Ace S-510 (available from Chisso Corporation)

Compound 7: vinyltrimethoxysilane KBM 1003 (available from Shin-Etsu Chemical Co., Ltd.)

Compound 8: ketimine-type latent curing agent Epicure H-30 (available from Mitsubishi Chemical Corporation)

Carbon black: #200 MP (available from NSCC Carbon Co., Ltd.)

Calcium carbonate 1: Super S (available from Maruo Calcium Co., Ltd.)

Calcium carbonate 2: KALFAIN 200 (available from Maruo Calcium Co., Ltd.)

Plasticizer 1: diisononyl phthalate (available from Jay Plus, Inc.)

Plasticizer 2: ShellSol™ (available from Japan Chemtech Ltd.)

Catalyst 1: dimorpholinodiethyl ether (available from San-Apro Ltd.)

Catalyst 2: Tin catalyst NEOSTANN U-303 (available from Nitto Kasei Co., Ltd.)

Production of Multilayer Member

Surface Treatment Step

One surface of a substrate (first member) (content of polypropylene: 80 mass %, content of inorganic substance (glass filler): 20 mass %) (width: 25 mm, length: 120 mm, thickness: 3 mm) formed from a polypropylene composite material (R-200G available from Prime Polymer Co., Ltd.) was subjected to a dry treatment under a treatment condition shown in Table 2. In Table 2, "flame" means a flame treatment, and "plasma" means a plasma treatment. Details of each treatment will be described below. In Comparative Example 1, a dry treatment was not performed.

FIG. 2 is a DSC curve of the polypropylene composite material used in Examples.

The peak temperature of endothermic peak obtained by DSC of the polypropylene composite material used in Examples was 165° C. The temperature at a starting point of endothermic peak obtained by DSC of the polypropylene composite material used in Examples was 120° C.

Adhesive Application Step

Subsequently, an adhesive shown in Table 2 was applied to the surface of the first member subjected to the dry treatment, to form an adhesive layer (thickness: 3 mm).

Adhering Step

Further, another substrate that was coated (material: polypropylene) (thickness: 25 mm, length: 120 mm, thickness: 3 mm) (second member) was adhered and compression-bonded to the adhesive layer, and allowed to stand in an environment of 23° C. and a relative humidity of 50% for three days. As a result, a multilayer member including the first member, an adhesion layer (a layer obtained by curing the adhesive layer), and the second member was obtained.

Evaluation of Adhesion

The adhesion layer of the obtained multilayer member was cut by a knife and the first member was separated from the second member by hand. A separation face was visually observed. The proportion of area of cohesive failure (CF) and the proportion of area of adhesive failure (AF) in the peeled face were examined. The results are shown in Table 2 (initial). The obtained multilayer member was subjected to a chemical resistance test (immersed in a window washer fluid for 240 hours). The same evaluation as described above was performed. The results are shown in Table 2 (chemical resistance).

Herein, "CF value" represents the proportion (%) of area of cohesive failure and "AF value" represents the proportion (%) of area of adhesive failure. For example, "CF90AF10" means that the proportion of area of cohesive failure is 90% and the proportion of area of interfacial failure is 10%.

As the proportion of area of cohesive failure is higher, the adhesion is more excellent. In practical terms, the proportion of area of cohesive failure is preferably not less than 90%, more preferably not less than 95%, and further preferably 100%.

TABLE 2

|  |  | Comparative Examples | | | | |
|---|---|---|---|---|---|---|
|  |  | 1 | 2 | 3 | 4 | 5 |
| Treatment condition | Treatment method | Without treatment | Flame | Flame | Flame | Flame |
|  | Speed (mm/s) | — | 400 | 400 | 400 | 500 |
|  | Distance (mm) | — | 20 | 20 | 20 | 20 |
|  | Number of treatments | — | 1 | 2 Continuous | 3 Continuous | 4 Continuous |
| Temperature of first member (° C.) | First treatment |  | 165 | 170 | 165 | 85 |
|  | Second treatment |  |  | 205 | 195 | 120 |
|  | Third treatment |  |  |  | 180 | 125 |
|  | Fourth treatment |  |  |  |  | 135 |
| Ultimate temperature (° C.) |  | — | Not satisfied 165 | Not satisfied 205 | Not satisfied 195 | Satisfied 135 |
| High temperature holding time (s) |  | — | Not satisfied 3.5 | Not satisfied 3.8 | Not satisfied 3.6 | Not satisfied 4.2 |
| Wetting index (dyn/cm) |  | 28 | 44 | 46 | 56 | 60 |
| Adhesive |  | 1 | 1 | 1 | 1 | 1 |
| Adhesion | Initial | Poor AF100 | Poor AF100 | Poor AF100 | Poor AF100 | Poor AF100 |
|  | Chemical resistance | Poor AF100 | Poor AF100 | Poor AF100 | Poor AF100 | Poor AF100 |

|  |  | Comparative Examples | | Examples | | |
|---|---|---|---|---|---|---|
|  |  | 6 | 7 | 1 | 2 | 3 |
| Treatment condition | Treatment method | Plasma | Plasma | Flame | Flame | Flame |
|  | Speed (mm/s) | 30 | 30 | 700 | 700 | 700 |
|  | Distance (mm) | 20 | 20 | 20 | 20 | 20 |
|  | Number of treatments | 1 | 2 Continuous | 1 | 2 Continuous | 3 Continuous |
| Temperature of first member (° C.) | First treatment | 145 | 140 | 80 | 65 | 70 |
|  | Second treatment |  | 165 |  | 95 | 95 |
|  | Third treatment |  |  |  |  | 125 |
|  | Fourth treatment |  |  |  |  |  |
| Ultimate temperature (° C.) |  | Satisfied 145 | Not satisfied 165 | Satisfied 80 | Satisfied 95 | Satisfied 125 |
| High temperature holding time (s) |  | Not satisfied 3.0 | Not satisfied 3.5 | Satisfied 0 | Satisfied 0 | Satisfied 0.5 |
| Wetting index (dyn/cm) |  | 42 | 54 | 38 | 42 | 50 |
| Adhesive |  | 1 | 1 | 1 | 1 | 1 |
| Adhesion | Initial | Poor CF20 AF80 | Poor AF100 | Excellent CF100 | Excellent CF100 | Excellent CF100 |
|  | Chemical resistance | Poor AF100 | Poor AF100 | Good to excellent CF98 AF2 | Excellent CF100 | Good CF90 AF10 |

TABLE 2-continued

| | | Examples | | | |
|---|---|---|---|---|---|
| | | 4 | 5 | 6 | 7 |
| Treatment condition | Treatment method | Flame | Flame | Flame | Flame |
| | Speed (mm/s) | 800 | 700 | 600 | 600 |
| | Distance (mm) | 20 | 20 | 20 | 20 |
| | Number of treatments | 4 Continuous | 2 Intermittent | 3 Intermittent | 4 Intermittent |
| Temperature of first member (° C.) | First treatment | 55 | 95 | 110 | 110 |
| | Second treatment | 80 | 90 | 115 | 115 |
| | Third treatment | 95 | | 120 | 125 |
| | Fourth treatment | 120 | | | 125 |
| Ultimate temperature (° C.) | | Satisfied 120 | Satisfied 95 | Satisfied 120 | Satisfied 125 |
| High temperature holding time (s) | | Satisfied 0.5 | Satisfied 0 | Satisfied 0.5 | Satisfied 1.3 |
| Wetting index (dyn/cm) | | 56 | 38 | 44 | 48 |
| Adhesive | | 1 | 1 | 1 | 1 |
| Adhesion | Initial | Excellent CF100 | Excellent CF100 | Excellent CF100 | Excellent CF100 |
| | Chemical resistance | Good CF95 AF5 | Excellent CF100 | Good CF95 AF5 | Good CF95 AF5 |

| | | Examples | | | |
|---|---|---|---|---|---|
| | | 8 | 9 | 10 | 11 |
| Treatment condition | Treatment method | Plasma | Plasma | Flame | Flame |
| | Speed (mm/s) | 55 | 55 | 700 | 700 |
| | Distance (mm) | 20 | 20 | 20 | 20 |
| | Number of treatments | 1 | 2 Intermittent | 1 | 1 |
| Temperature of first member (° C.) | First treatment | 110 | 115 | 80 | 80 |
| | Second treatment | | 105 | | |
| | Third treatment | | | | |
| | Fourth treatment | | | | |
| Ultimate temperature (° C.) | | Satisfied 110 | Satisfied 115 | Satisfied 80 | Satisfied 80 |
| High temperature holding time (s) | | Satisfied 0 | Satisfied 0 | Satisfied 0 | Satisfied 0 |
| Wetting index (dyn/cm) | | 38 | 54 | 38 | 38 |
| Adhesive | | 1 | 1 | 2 | 3 |
| Adhesion | Initial | Excellent CF100 | Excellent CF100 | Good CF95 AF5 | Good CF95 AF5 |
| | Chemical resistance | Good to excellent CF98 AF2 | Excellent CF100 | Good CF95 AF5 | Good CF95 AF5 |

Treatment Condition

In Table 2, "treatment conditions" are as follows.

Flame Treatment

In Table 2, the flame treatment is as follows.

The flame treatment was performed by using a burner (gas pressure: 0.4 MPa) under conditions (speed, distance, and the number of treatments) shown in Table 2. Specifically, a burner was moved over a fixed substrate. Thus, the burner (flame) was swept over the substrate.

Herein, the speed is the speed in the flame treatment. Specifically, the speed is the speed (mm/s) of the burner moved over the fixed substrate. The distance is the distance (mm) between the burner and the substrate. The number of treatments is the number of sweeping the burner (flame). For example, a case where the number of treatments is "1" means that the burner is swept from one end to the other end of the substrate once. A case where the number of treatments is "2" means that the burner is swept from one end to the other end of the substrate once, and then swept from the other end to the end of the substrate once. A case where the number of treatments is not less than 2 and is described as "continuous" means that sweeping is repeatedly performed without interval (continuous treatment). A case where the number of treatments is not less than 2 and is described as "intermittent" means that sweeping and cooling are performed followed by the next sweeping (intermittent treatment).

Plasma Treatment

In Table 2, the plasma treatment is as follows.

The plasma treatment was performed by using a treatment device available from Plasmatreat (gas type: air, output: 23 kHz) under conditions (speed, distance, and the number of treatments) shown in Table 2.

Herein, the speed is the speed in the plasma treatment. Specifically, the speed is the speed (mm/s) of a plasma discharge nozzle moved over the substrate. The distance is the distance (mm) between the plasma discharge nozzle and the substrate. The number of treatments is the number of sweeping the plasma discharge nozzle. For example, a case where the number of treatments is "1" means that the plasma discharge nozzle (plasma discharge) is swept from one end to the other end of the substrate once. A case where the number of treatments is "2" means that the plasma discharge nozzle is swept from one end to the other end of the substrate once, and then swept from the other end to the end of the substrate once. A case where the number of treatments is not less than 2 and is described as "continuous" means that sweeping is repeatedly performed without interval (continuous treatment). A case where the number of treatments is not less than 2 and is described as "intermittent" means that sweeping and cooling are performed followed by the next sweeping (intermittent treatment).

Temperature of First Member, Ultimate Temperature, and Higher Temperature Holding Time In Table 2, the "temperature of the first member" represents the highest temperature (° C.) of the first member in each dry treatment. The "ultimate temperature" represents the highest temperature (° C.) of the first member in the whole dry treatment. The "high temperature holding time" represents the time (s) of continuously holding the temperature of the first member to a temperature not lower than the temperature (120° C.) at the starting point in the dry treatment.

In the flame treatment, the temperature of the first member was measured by using an adhesive thermocouple. In the plasma treatment, the temperature of the first member was measured by using an ink and a seal to be discolored by heat and a thermography.

FIG. 3 is a diagram obtained by plotting the temperature of the first member with time in the surface treatment step of Example 1.

Wetting Index

In Table 2, "wetting index" represents the wetting index (dyn/cm) of the surface of the first member subjected to the dry treatment. The wetting index was measured by using a wetting reagent (available from Wako Pure Chemical Industries, Ltd.). As the wetting index is higher, the surface is more hydrophilic.

As is clear from Table 2, multilayer members obtained by a production method in Examples in which a dry treatment was performed so as to satisfy the specific conditions exhibited excellent adhesion without a primer.

As confirmed from comparison with Examples 1, 10, and 11, Example 1 in which a urethane-based adhesive containing isocyanurate and a terpene resin was used as an adhesive exhibited more excellent adhesion.

As confirmed from comparison with Examples 1 to 9 (adhesive 1), Examples 1, 2, 5, 8, and 9 in which the high temperature holding time was less than 0.5 seconds exhibited more excellent adhesion (chemical resistance). In particular, Examples 2, 5, and 9 in which the dry treatment included a plurality of single dry treatments (a plurality of times) exhibited further excellent adhesion (chemical resistance).

On the other hand, the multilayer members obtained by production methods in Comparative Examples 2 to 7 in which a dry treatment was performed so as not to satisfy the specific conditions exhibited insufficient adhesion.

The invention claimed is:

1. A method for producing a multilayer member having a first member containing a crystallizable thermoplastic resin, an adhesion layer, and a second member in this order, the method comprising:
    a surface treatment step of performing a dry treatment on a surface of the first member containing a crystallizable thermoplastic resin to satisfy conditions A and B;
    an adhesive application step of applying an adhesive to the surface of the first member subjected to the dry treatment without a primer composition, to form an adhesive layer on the surface; and
    an adhering step of adhering a surface of the second member directly to the adhesive layer;
    Condition A: an ultimate temperature of the first member is lower than a peak temperature of endothermic peak obtained by differential scanning calorimetry of the crystallizable thermoplastic resin contained in the first member; and
    Condition B: a high temperature holding time of the first member is less than 0.5 seconds, wherein a high temperature holding time of the first member is a time when the first member is continuously held at a temperature not lower than a temperature at a starting point of the endothermic peak obtained by differential scanning calorimetry of the crystallizable thermoplastic resin contained in the first member.

2. The method for producing a multilayer member according to claim 1, wherein the second member is a coated member.

3. The method for producing a multilayer member according to claim 1, wherein the dry treatment is at least one selected from the group consisting of a corona treatment, a plasma treatment, a flame treatment, ITRO treatment, an UV treatment, and an excimer treatment.

4. The method for producing a multilayer member according to claim 1, wherein the first member is a composite material containing a polyolefin resin as the crystallizable thermoplastic resin and an inorganic substance.

5. The method for producing a multilayer member according to claim 1, wherein the adhesive is at least one selected from the group consisting of a urethane-based adhesive, an epoxy-based adhesive, a modified silicone-based adhesive, and an acrylic adhesive.

6. The method for producing a multilayer member according to claim 1, wherein in the dry treatment, the temperature of the first member is measured by using a contact thermocouple, an ink to be discolored by heat, a seal to be discolored by heat, a thermography, or a radiation thermometer.

7. The method for producing a multilayer member according to claim 1, further comprising a surface treatment step of performing a dry treatment on a surface of the second member before the adhering step to satisfy conditions A2 and B2,
    wherein the second member contains a crystallizable thermoplastic resin, and in the bonding step, the surface of the second member in which the surface treatment is performed is bonded to the adhesive layer;

Condition A2: an ultimate temperature of the second member is lower than the peak temperature of endothermic peak obtained by differential scanning calorimetry of the crystallizable thermoplastic resin contained in the second member; and Condition B2: a high temperature holding time of the second member is less than 3.0 seconds, where a high temperature holding time of the second member is a time when the second member is continuously held at a temperature not lower than a temperature at a starting point of the endothermic peak obtained by differential scanning calorimetry of the crystallizable thermoplastic resin contained in the second member.

8. The method for producing a multilayer member according to claim 2, wherein the dry treatment is at least one selected from the group consisting of a corona treatment, a plasma treatment, a flame treatment, ITRO treatment, an UV treatment, and an excimer treatment.

9. The method for producing a multilayer member according to claim 2, wherein the first member is a composite material containing a polyolefin resin as the crystallizable thermoplastic resin and an inorganic substance.

10. The method for producing a multilayer member according to claim 3, wherein the first member is a composite material containing a polyolefin resin as the crystallizable thermoplastic resin and an inorganic substance.

11. The method for producing a multilayer member according to claim 8, wherein the first member is a composite material containing a polyolefin resin as the crystallizable thermoplastic resin and an inorganic substance.

12. The method for producing a multilayer member according to claim 2, wherein the adhesive is at least one selected from the group consisting of a urethane-based adhesive, an epoxy-based adhesive, a modified silicone-based adhesive, and an acrylic adhesive.

13. The method for producing a multilayer member according to claim 3, wherein the adhesive is at least one selected from the group consisting of a urethane-based adhesive, an epoxy-based adhesive, a modified silicone-based adhesive, and an acrylic adhesive.

14. The method for producing a multilayer member according to claim 4, wherein the adhesive is at least one selected from the group consisting of a urethane-based adhesive, an epoxy-based adhesive, a modified silicone-based adhesive, and an acrylic adhesive.

15. The method for producing a multilayer member according to claim 8, wherein the adhesive is at least one selected from the group consisting of a urethane-based adhesive, an epoxy-based adhesive, a modified silicone-based adhesive, and an acrylic adhesive.

16. The method for producing a multilayer member according to claim 9, wherein the adhesive is at least one selected from the group consisting of a urethane-based adhesive, an epoxy-based adhesive, a modified silicone-based adhesive, and an acrylic adhesive.

17. The method for producing a multilayer member according to claim 10, wherein the adhesive is at least one selected from the group consisting of a urethane-based adhesive, an epoxy-based adhesive, a modified silicone-based adhesive, and an acrylic adhesive.

18. The method for producing a multilayer member according to claim 11, wherein the adhesive is at least one selected from the group consisting of a urethane-based adhesive, an epoxy-based adhesive, a modified silicone-based adhesive, and an acrylic adhesive.

19. The method for producing a multilayer member according to claim 2, wherein in the dry treatment, the temperature of the first member is measured by using a contact thermocouple, an ink to be discolored by heat, a seal to be discolored by heat, a thermography, or a radiation thermometer.

20. The method for producing a multilayer member according to claim 3, wherein in the dry treatment, the temperature of the first member is measured by using a contact thermocouple, an ink to be discolored by heat, a seal to be discolored by heat, a thermography, or a radiation thermometer.

* * * * *